United States Patent [19]

Schöneck et al.

[11] Patent Number: 4,762,107
[45] Date of Patent: Aug. 9, 1988

[54] ELECTRONIC CONTROL DEVICE FOR OPERATING PARAMETERS

[75] Inventors: Günter Schöneck; Gerhard Stumpp, both of Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 557,392

[22] Filed: Dec. 2, 1983

Related U.S. Application Data

[63] Continuation of Ser. No. 295,047, Aug. 21, 1981, abandoned.

[30] Foreign Application Priority Data

Aug. 28, 1980 [DE] Fed. Rep. of Germany ....... 3032381

[51] Int. Cl.$^4$ .................. F02M 25/06; F02D 35/00
[52] U.S. Cl. ................................. 123/478; 123/472; 123/569; 123/571
[58] Field of Search ............... 123/478, 472, 569, 499, 123/571, 480, 425, 494, 458; 73/116, 117.3

[56] References Cited

U.S. PATENT DOCUMENTS

| | | | |
|---|---|---|---|
| 3,842,811 | 10/1974 | Shinoda et al. | 123/494 |
| 4,123,729 | 10/1978 | Buetemeirder | 123/494 |
| 4,173,205 | 11/1979 | Toelle | 123/571 |
| 4,190,029 | 2/1980 | Taplin | 123/571 |
| 4,242,728 | 12/1980 | Hartford | 123/480 |
| 4,265,205 | 5/1981 | Garvéa | 123/425 |
| 4,269,156 | 5/1981 | Drellshak | 123/478 |
| 4,286,567 | 9/1981 | Ueda | 123/569 |
| 4,289,108 | 9/1981 | Shioyama | 123/571 |
| 4,295,453 | 10/1981 | Scilly et al. | 123/499 |
| 4,304,210 | 12/1981 | Hayakawa | 123/571 |
| 4,328,779 | 5/1982 | Hattori et al. | 123/425 |
| 4,345,561 | 8/1982 | Kondo et al. | 123/478 |
| 4,351,299 | 9/1982 | Costello | 123/472 |
| 4,355,620 | 10/1982 | Scilly et al. | 123/499 |
| 4,359,032 | 11/1982 | Ohie | 123/458 |
| 4,359,991 | 11/1982 | Stumpp et al. | 123/478 |
| 4,372,266 | 2/1983 | Hiyama et al. | 123/494 |

FOREIGN PATENT DOCUMENTS

| | | | |
|---|---|---|---|
| 1526508 | 4/1970 | Fed. Rep. of Germany | 123/494 |
| 1601364 | 8/1970 | Fed. Rep. of Germany | 123/494 |
| 2305605 | 10/1976 | France | 123/494 |

Primary Examiner—Raymond A. Nelli
Attorney, Agent, or Firm—Edwin E. Greigg

[57] ABSTRACT

An electronic control device is proposed for manipulated variables of an internal combustion engine having self-ignition. In this device, an injection duration signal is utilized as a load signal. While the injection onset signal can be satisfactorily detected via the opening speed, the hysteresis signal is efficaciously utilized to detect the signal for the end of injection. The proposed solution makes it possible to detect and regulate both the injection onset and the fuel quantity, using only a single transducer in the injection valve, on or in the fuel line, or on the pumping element, and this load signal is available for generalized uses in the control device. It is furthermore possible to obtain an rpm signal on the basis of the signal for injection onset and/or end, and to process it further.

17 Claims, 3 Drawing Sheets

ELECTRONIC CONTROL DEVICE FOR OPERATING PARAMETERS

This is a continuation of application Ser. No. 295,047, filed Aug. 21, 1981, now abandoned.

BACKGROUND OF THE INVENTION

Although Diesel injection was previously a domain of purely mechanical construction, electronics technology has rapidly gained ground in this field. It is known, for instance, to control the regulating rod of an injection rod by means of an electromagnet system, which in turn receives its input pulses from an electronic regulating device. Because of the electronics, the possibilities for manipulation are virtually unlimited, so that in fact all the parameters associated with an internal combustion engine can be taken into consideration in the course of control.

One important operating characteristic in the regulation of an internal combustion engine with externally-supplied ignition is the injected fuel quantity. It is known either to determine the injection quantity directly, by means of a flow-through quantity meter, or instead to evaluate the position signal of the regulating rod as a quantity signal. While in the first measurement method, the very small injection quantities per unit of the time cause difficulties, the second method has the deficiency that the metered fuel quantity is detected only by indirect means, and it is thus not possible to furnish measurement results which are independent of the effects of aging.

OBJECT AND SUMMARY OF THE INVENTION

The electronic control device for operating parameters in an internal combustion engine with self-ignition has the advantage over the prior art that correct results are furnished, independently of the magnitude of the metered fuel quantity and also independently of the effects of aging on the part of the engine. Furthermore, no additional sensors are necessary in the control device according to the invention, other than those which are present in any event in an electronic injection-regulating system.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
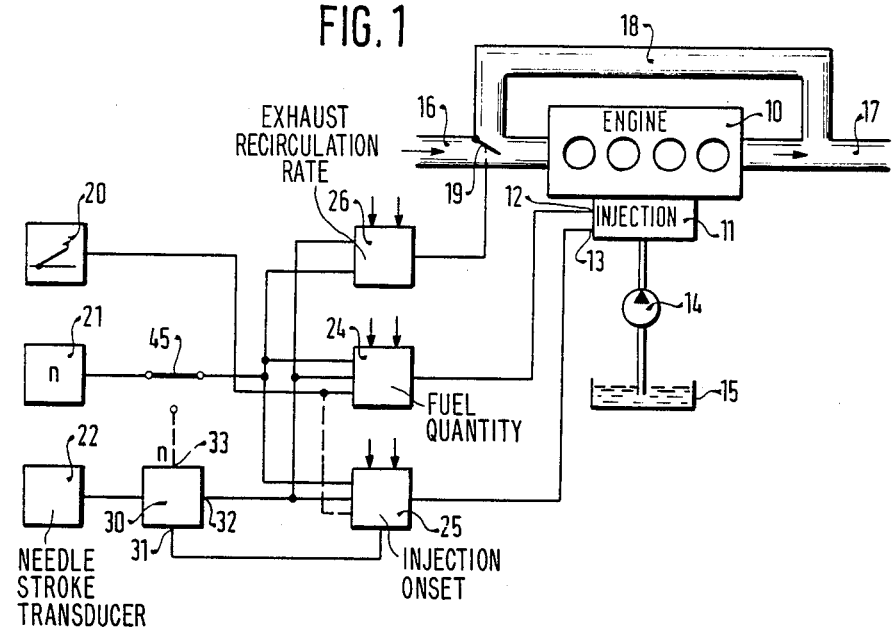
FIG. 1 is a schematic diagram of an electronic control device for operating parameters in an internal combustion engine with self-ignition.

In block diagram and schematic form, FIG. 1 shows an internal combustion engine 10 with self-ignition, together with the electronic control devices 24 to 26 for operating parameters and their respective transducers 20-22. The injection control system 11 has two inputs 12 and 13 for the fuel quantity and the injection onset, respectively. A fuel pump 14 supplies fuel from a tank 15 to the injection device 11. Also shown are an intake line 16, an exhaust line 17 and an exhaust recirculation conduit 18. The proportion of fresh air to exhaust gas can be determined by means of a mixture valve 19 in the intake tube.

Further shown are a transducer 20 for the position of the driving pedal, an rpm transducer 11 and a needle-stroke transducer 22 for positioning of the needle in the injection nozzle. The actual control device is divided into three units, one for the fuel quantity 24, one for the injection onset 25 and one for the exhaust recirculation rate 26. The unit 24 for the fuel quantity is connected with input 12 of the injection device 11, and the unit 25 for the injection onset is connected with input 13. The corresponding unit 26 for the exhaust recirculation triggers the mixture valve 19.

The individual units 24, 25 and 26 of the control device are known per se and have long been associated with the prior art. They receive input signals from the individual transducers as well as from temperature sensors, for instance, in order to produce a correction signal. The control unit 24 for the fuel quantity receives its input signals from the driving pedal 20 and the rpm transducer 21, and with a view to regulating fuel quantity, it also receives an actual-value signal for fuel quantity. The injection onset control unit 25, in a corresponding fashion, receives actual values for rpm and fuel quantity as well as an actual value for injection onset. In addition, a signal from the driving pedal position transducer 20 may effect a preliminary control. The actual fuel quantity and the rpm, at least, determine the output signal of the control unit 26 for the exhaust recirculation.

A separate block identified by reference numeral 30 receives at its input a signal from the needle-stroke transducer 22, and it has three outputs 31, 32 and 33 for the injection onset, the actual fuel-quantity value, and the rpm value.

What is of the essence in the subject of FIG. 1 is that the injection duration is determined on the basis of signals for the onset and end of injection, and this injection duration signal is utilized as a load signal for the individual units in the control device—in this case, the units 24-26.

The difficulties associated with obtaining the load signal from signals pertaining to the onset and end of injection arise because such signals are frequently not available in a clear form; these signals are vulnerable to malfunction; and such occurrences as chattering of the needle in the injection nozzle do not permit the precise fixing of the onset and end of injection.

Figure 2:
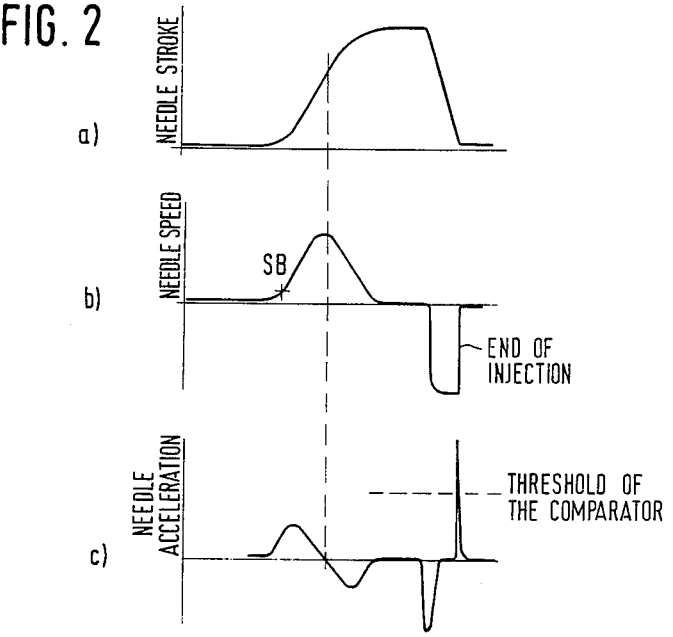
FIG. 2 shows plot diagrams of the output signal of a needle-stroke transducer acting as a sensor for injection onset and end of injection, as well as plot diagrams for further signal processing.

From FIG. 2, it may be learned how these difficulties are overcome in accordance with the invention.

FIG. 2, in simplified form, shows the output signal of the needle stroke transducer 22 of FIG. 1. When the injection nozzle is in the closed state, this signal is at a very low level, and it increases when the injection nozzle opens. With the subsequent closing movement, the potential again drops. FIG. 2b shows the differentiated signal according to FIG. 2a (that is, equal to needle velocity). A positive signal peak is seen to be associated with the opening movement of the valve, and a negative peak is associated with the closing movement. The very steep "trailing edge" of the differentiated signal at the end of injection is caused by the fact that the needle in the injection nozzle, is rapidly braked, and a large change in velocity occurs when the needle strikes against the stop in the transition in its state of rest. This is illustrated particularly clearly in FIG. 2c, where the acceleration of the position signal according to FIG. 2a is diagrammed. The very high pulse peak at the end of the closing procedure of the magnetic valve can be called up by means of a comparator and a reliable signal for the end of injection can be provided on the basis of this pulse peak.

Figure 3:
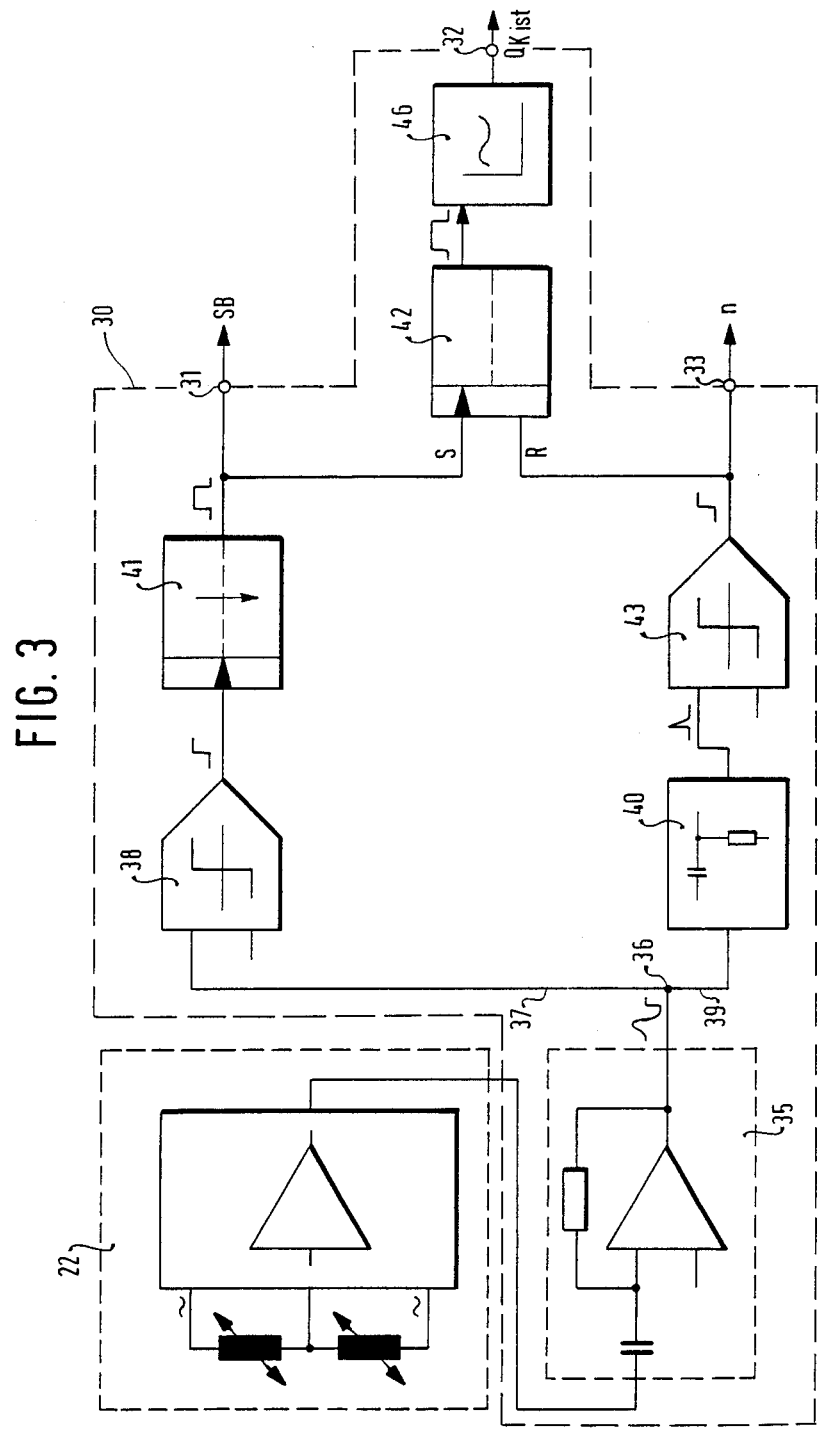
FIG. 3 shows a first exemplary embodiment of a circuit for determining injection duration.

FIG. 3 is a block circuit diagram for the evaluation circuit 30 for the signal from the needle-stroke transducer 22. This transducer apparatus 22 itself follows a differentiation circuit 35, whose output is switched to a branching point 36. From there, a first line 37 leads to a first comparator 38 for determining the injection onset, and a second line 39 leads to a further differentiation element 40. The output signal of the first differentiation circuit 35 corresponds to the signal of FIG. 2b, and the output signal of the differentiation circuit 40 similarly corresponds to that of FIG. 2c. The first comparator circuit 38 is followed by a monostable multivibrator 41, so that any after-injections which may occur will be suppressed. As this monostable multivibrator 41 switches ON, the leading edge of its pulse furnishes the signal pertaining to the injection onset at the output connection point 31 of block 30 of FIG. 1. This signal is additionally carried to the S input of an SR flip-flop 42, whose R input is preceded by a comparator 43 for the output signal of the second differentiation circuit 40. This comparator circuit 43 detects the very high peak (visible in FIG. 2c) occurring at the end of injection on the part of the valve.

Since in an internal combustion engine with direct injection the individual injection events are in a fixed relationship with the rpm, it is possible to derive an rpm signal as well from the signals for injection onset and end. With a view to reduced vulnerability to malfunction, the end of injection is evaluated in this instance as an rpm signal, because according to FIG. 2c this signal attains a very high value. For this reason, the output of the comparator circuit 43 is also carried to the connection point 33 of block 30 of FIG. 1. If this rpm signal is to be delivered to the units 24 to 26, then the alternating switch 45 seen in FIG. 1, which suggests this selective capacity, must be shifted into its other position to connect connection point 33 rather than the one shown; in this case, the rpm meter 21 may also be eliminated.

In principle, the rpm information may, however, also be derived from the injection onset or the injection duration. An injection duration signal appears at the output of the SR flip-flip 42 of the circuit layout of FIG. 3; this injection duration signal commences at the injection onset and terminates at the end of injection. By means of a subsequent performance graph 46, this injection duration signal may be converted into an injection quantity signal, which is then available for use at the output 32. Using the performance graph 46 is appropriate, because as a rule the injection quantity is not directly proportional to the injection duration, for instance if the pressure over the total injection phase is not constant.

In the example of FIG. 3, a needle-stroke transducer having two variable inductances is used as the sensor for the course of injection in the injection nozzle. The output signal of this transducer corresponds to a position signal relating to the needle.

Figure 4:
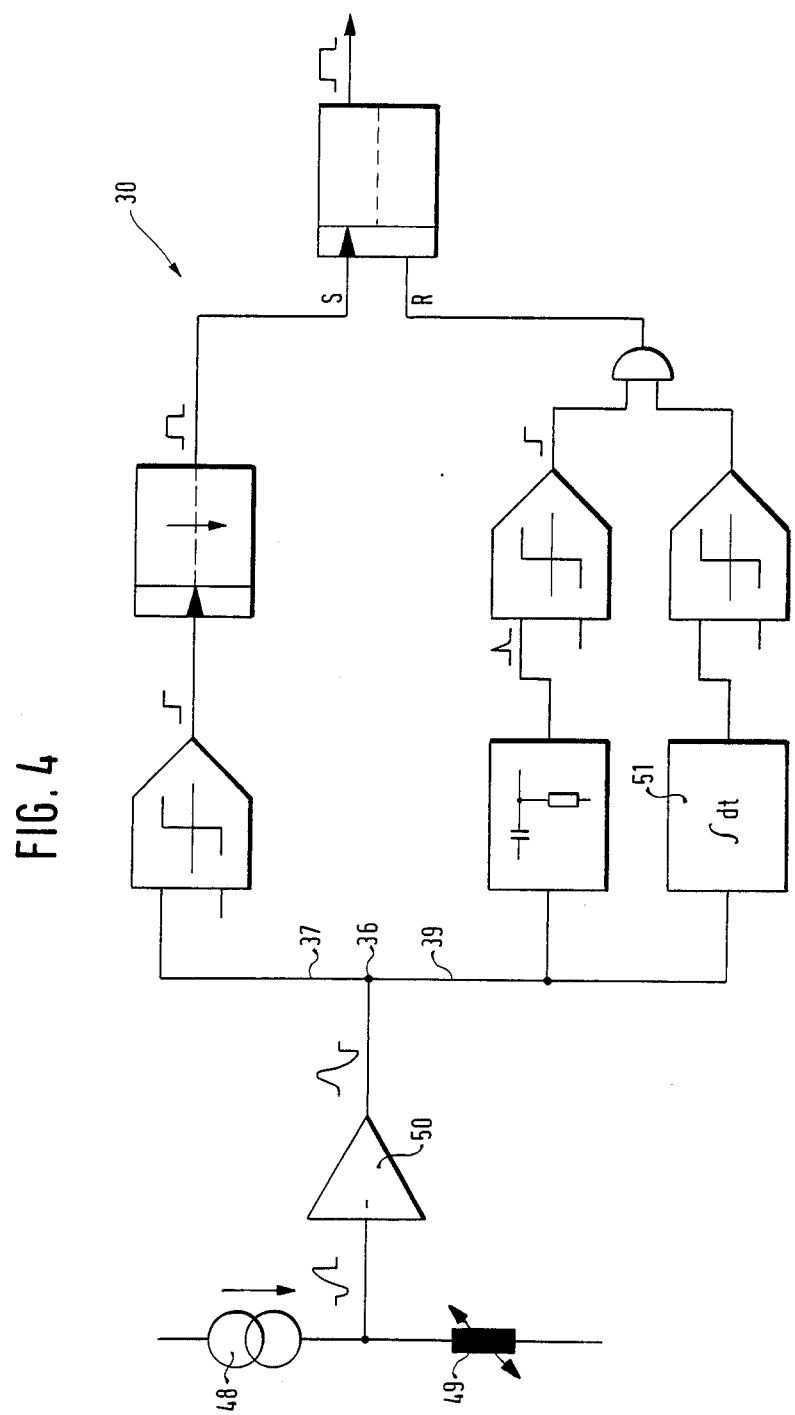
FIG. 4 shows a second form of embodiment of a circuit for determining injection duration, with a modified input.

Other inductive transducers are also known, which detect the speed of the change in an inductance value. One such example is shown in principle in FIG. 4, and it includes a constant-current source in series with the variable impedance or inductance 49; in this case, the only element disposed between the connecting point of the current source 48 and inductance 49 on the one hand and the branching point 36 on the other is a reversing or inverter circuit 50. If the speed transducer (for speed-of-change, not velocity of the vehicle or engine speed) is used, it is therefore possible to do without the first differentiation circuit 35 of the subject of FIG. 3, because in this case, as the term indicates, the speed of the change in inductance is already being detected. Otherwise, the arrangement here corresponds to that of FIG. 3, with the exception of the means of obtaining the signal for the end of injection. The fundamental concept here is to fix the end of injection for the case where the needle position is below a predetermined, approximate threshold and the deceleration is above a given threshold, in order to blank out needle-deceleration signals upon reaching the upper limit for the needle stroke. If the needle-stroke signal is not present in direct form, but only in the form of the needle-speed signal (as in the subject of FIG. 4), the needle position can be determined from this by means of integration performed in circuit 51.

The foregoing relates to preferred exemplary embodiments of the invention, it being understood that other embodiments and variants thereof are possible within the spirit and scope of the invention, the latter being defined by the appended claims.

What is claimed and desired to be secured by letters patent of the United States is:

1. An electronic control device for exhaust gas recirculation rate in an internal combustion engine having self ignition and having an injection nozzle and needle therein, comprising
   electronic measuring means for producing a signal indicating the position of said needle in said injection nozzle,
   electronic means for producing an actual injection duration signal dependent on said signal produced by said measuring means, and
   electronic means for producing control variable signals dependent upon said actual injection duration signal for controlling said exhaust gas recirculation rate.

2. An electronic control device for fuel quantity and exhaust gas recirculation rate in an internal combustion engine having self ignition and having an injection nozzle and needle therein, comprising
   electronic measuring means for producing a signal representative of the position of said needle in said injection nozzle,
   electronic means for producing an actual injection duration signal dependent on said signal produced by said measuring means, and
   electronic control means for producing variable control signals dependent upon said actual injection duration signal for controlling said fuel quantity and said exhaust gas recirculation rate.

3. An electronic control device for injection onset and exhaust gas recirculation rate in an internal combustion engine having self ignition and having an injection nozzle and needle therein, comprising electronic measuring means for producing a signal representative of the position of said needle in said injection nozzle, electronic means for producing an actual injection duration signal dependent on said signal produced by said measuring means, and electronic control means for producing variable control signals dependent upon said actual injection duration signal for controlling said injection onset and exhaust gas recirculation rate.

4. An electronic control device for injection onset fuel quantity and exhaust gas recirculation rate in an internal combustion engine having self ignition and having an injection nozzle and needle therein, comprising electronic measuring means for producing a signal representative of the position of said needle in said injection nozzle, electronic means for producing an actual injection duration signal dependent on said signal produced by said measuring means, and electronic control means for producing variable control signals dependent upon said actual injection duration signal for controlling said injection onset, said fuel quantity and said exhaust gas recirculation rate.

5. A method for controlling exhaust gas recirculation rate in an internal combustion engine having self ignition and having an injection nozzle and needle therein, comprising the steps of generating a first electronic signal indicating the position of said needle in said injection nozzle, generating a second electronic signal indicating actual injection duration dependent on said first electronic signal, generating electronic control variable signals dependent upon said second electronic signal, and electronically controlling said exhaust gas recirculation rate with said control variable signals.

6. A method for controlling fuel quantity and exhaust gas recirculation rate in an internal combustion engine having self ignition and having an injection nozzle and needle therein, comprising the steps of generating a first electronic signal indicating the position of said needle in said injection nozzle, generating a second electronic signal indicating actual injection duration dependent on said first electronic signal, generating electronic control variable signals dependent upon said second electronic signal, and electronically controlling said fuel quantity and said exhaust gas recirculation rate with said control variable signals.

7. A method for controlling injection onset and exhaust gas recirculation rate in an internal combustion engine having self ignition and having an injection nozzle and needle therein, comprising the steps of generating a first electronic signal indicating the position of said needle in said injection nozzle, generating a second electronic signal indicating actual injection duration dependent on said first electronic signal, generating electronic control variable signals dependent upon said second electronic signal, and electronically controlling said injection onset and said exhaust gas recirculation rate with said control varible signals.

8. A method for controlling injection onset fuel quantity and exhaust gas recirculation rate in an internal combustion engine having self ignition and having an injection nozzle and needle therein, comprising the steps of generating a first electronic signal indicating the position of said needle in said injection nozzle, generating a second signal indicating actual injection duration dependent on said first electronic signal, generating electronic control variable signals dependent upon said second electronic signal, and electronically controlling said injection onset, said fuel quantity and said exhaust gas recirculation rate with said control variable signals.

9. An electronic control device as defined by claim 1, 2, 3, or 4, wherein said measuring means is disposed as close as possible to the metering location.

10. An electronic control device as defined by claim 9, wherein said measuring means comprises a variable inductance.

11. An electronic control device as defined by claim 9, wherein said signal from said measuring means is fed to at least one differentiation circuit.

12. A device as defined by at least one of the foregoing claims 1, 2, 3 or 4, wherein the injection onset for said actual injection duration signal is detected on the basis of the speed of said valve needle and the end of injection for said duration signal is preferably detected on the basis of the deceleration of said valve needle.

13. An electronic control device as defined by claim 10, wherein said measuring means comprises a so-called needle-stroke transducer.

14. A device as defined by claim 13, wherein said signal of said measuring means is processed via a differentation circuit to a first comparator circuit in order to determine the injection onset for said injection duration signal, and to a further differentation circuit and and subsequent comparator circuit in order to determine the end of injection for said duration signal.

15. An electronic control device as defined by claim 14, wherein the output of said comparator circuit for the injection onset is fed to a monostable multivibrator.

16. An electronic control device as defined by claim 12, wherein an rpm signal may be derived selectively from at least one of the injection onset signal for said duration signal, the signal for the end of injection for said duration signal and the actual injection duration signal.

17. An electronic control device as defined by at least one of the claims 1, 2, 3 or 4, wherein said first electronic signal indicating the position of said needle corresponds to the end of injection for said duration signal when said first electronic signal has a value below a given threshold value and the deceleration of said needle is above a given threshold.

* * * * *